United States Patent
Robert et al.

(10) Patent No.: US 12,333,646 B2
(45) Date of Patent: Jun. 17, 2025

(54) SHADOW-BASED ESTIMATION OF 3D LIGHTING PARAMETERS FROM REFERENCE OBJECT AND REFERENCE VIRTUAL VIEWPOINT

(71) Applicant: InterDigital CE Patent Holdings, SAS, Paris (FR)

(72) Inventors: Philippe Robert, Rennes (FR); Anthony Laurent, Vignoc (FR); Pierrick Jouet, Rennes (FR); Tao Luo, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 258 days.

(21) Appl. No.: 18/012,500

(22) PCT Filed: Jun. 23, 2021

(86) PCT No.: PCT/EP2021/067137
§ 371 (c)(1),
(2) Date: Dec. 22, 2022

(87) PCT Pub. No.: WO2022/002716
PCT Pub. Date: Jan. 6, 2022

(65) Prior Publication Data
US 2023/0260207 A1 Aug. 17, 2023

(30) Foreign Application Priority Data
Jun. 30, 2020 (EP) .................................... 20305725

(51) Int. Cl.
*G06T 15/60* (2006.01)
*G06T 15/50* (2011.01)
(Continued)

(52) U.S. Cl.
CPC ............ *G06T 15/60* (2013.01); *G06T 15/506* (2013.01); *G06V 10/25* (2022.01); *G06V 20/20* (2022.01); *G06T 2215/16* (2013.01)

(58) Field of Classification Search
CPC ... G06T 15/60; G06T 2215/16; G06T 19/006; G06T 11/00; G06V 10/25; G06V 20/20
See application file for complete search history.

(56) References Cited

U.S. PATENT DOCUMENTS

| 2011/0234631 | A1 | 9/2011 | Kim et al. | |
| 2015/0049086 | A1* | 2/2015 | Morato | G06T 15/06 345/427 |
| 2015/0279113 | A1* | 10/2015 | Knorr | G06T 7/11 345/633 |

FOREIGN PATENT DOCUMENTS

| CN | 104952103 B | 3/2018 |
| EP | 3540697 A1 | 9/2019 |
| WO | WO 2019175057 A1 | 9/2019 |

OTHER PUBLICATIONS

S. Jiddi, P. Robert and E. Marchand, "[Poster] Illumination Estimation Using Cast Shadows for Realistic Augmented Reality Applications," 2017 IEEE International Symposium on Mixed and Augmented Reality (ISMAR-Adjunct), Nantes, France, 2017, pp. 192-193, doi: 10.1109/ISMAR-Adjunct.2017.63. (Year: 2017).*

(Continued)

*Primary Examiner* — Daniel F Hajnik
*Assistant Examiner* — Chris Alejandro Puntier
(74) *Attorney, Agent, or Firm* — Condo Roccia Koptiw LLP

(57) ABSTRACT

A method and device are provided for processing images. In one embodiment, the method comprises receiving an image is received of a scene having a plurality of real objects and determining if at least one of these real objects is a reference object stored in a database. Subsequently, candidate shadow (Continued)

map of the reference object identified is retrieved when available and when a reference object cannot be identified, an object in the scene with adequate parameters is selected and the candidate shadow maps of this new reference object using said lighting parameters is computed.

12 Claims, 10 Drawing Sheets

(51) Int. Cl.
*G06V 10/25* (2022.01)
*G06V 20/20* (2022.01)

(56) References Cited

OTHER PUBLICATIONS

Arief, Ibrahim et al. "Realtime Estimation of Illumination Direction for Augmented Reality on Mobile Devices." International Conference on Communications in Computing (2012). (Year: 2012).*
Kolivand et al, "Shadow Generation in Mixed Reality: A Comprehensive Survey", IETE Technical Review, vol. 32, No. 1, Dec. 8, 2014, 14 pages.
Jiddi, "Probeless an Realistic Mixed Reality Application in Presence of Dynamic Light Sources", Institute of Electronics and Electrical Engineers (IEEE), 2018 IEEE International Symposium on Mixed and Augmented Reality Adjunct (ISMAR-Adjunct), Munich, Germany, Oct. 16, 2018, 2 pages.

* cited by examiner

SHADOW-BASED ESTIMATION OF 3D LIGHTING PARAMETERS FROM REFERENCE OBJECT AND REFERENCE VIRTUAL VIEWPOINT

CROSS REFERENCE TO RELATED APPLICATIONS

This application is a U.S. National Stage Application under 35 U.S.C. 371 of International Patent Application No. PCT/EP2021/067137, filed Jun. 23, 2021, which is incorporated herein by reference in its entirety.

This application claims the benefit of European Patent Application No. 20305725.2, filed Jun. 30, 2020.

TECHNICAL FIELD

The present disclosure generally relates to lighting for mixed reality and more particularly to lighting estimation of scenes from a reference virtual viewpoint.

BACKGROUND

Most consumer devices today can digitally capture an image or video with a single sensor which integrates light at the pixel level. However, lighting assessment and information become very important when real scenes are mixed with Computer Generated items that are often of virtual nature. In mixed reality, where real and virtual objects are inserted into a 3D model of a real scene, lighting of the virtual objects is a key feature in order to provide a realistic aspect of the scene. The virtual objects should be lighted correctly by imitating the real lighting of the scene. However, lighting environment may change dynamically. Therefore, 3D lighting of a real scene has to be continuously estimated.

Unfortunately estimating accurate lighting conditions is a time-consuming task in mixed reality applications, especially when dealing with real-time renderings. Rendering shadows cast by the virtual objects onto the real scene is essential. Two main features contribute to the realism of the cast shadows. One is the location/orientation of the shadows and a second factor is the strength given by the attenuation of the color intensity of the shaded surface. A set of virtual lighting models is presented to create hard shadows: point lights, spotlights or directional lighting. But providing such lighting is a time-consuming and difficult task in real-time rendering. Consequently, techniques need to be presented that simplify this task and create realistic renderings. It would be beneficial if such techniques can provide the rendered images on every device including on a mobile device.

SUMMARY

Additional features and advantages are realized through similar techniques and other embodiments and aspects are described in detail herein and are considered a part of the claimed invention. For a better understanding of the invention with advantages and features, refer to the description and to the drawings.

A method and device is provided for processing images. In one embodiment, the method comprises receiving an image of a scene having a plurality of real objects and determining if at least one of these real objects is a reference object stored in a database. Subsequently, candidate shadow maps of the reference object identified are retrieved when available and when a reference object cannot be identified, an object in the scene with adequate parameters is selected and the candidate shadow maps of this new reference object using lighting parameters are computed.

In another embodiment, subsequent to this method steps, the reference object is then stored in a database—this could be even a reference object model—as well as its candidate shadow map—in the database. An object is then retrieved from the database such that the object matches with one or more characteristic of a real object in said scene. The shadow maps for reference object appearing in the scene is provided, using said lighting parameters.

BRIEF DESCRIPTION OF THE DRAWINGS

The teachings of the present disclosure can be readily understood by considering the following detailed description in conjunction with the accompanying drawings, in which.

Figure 1:
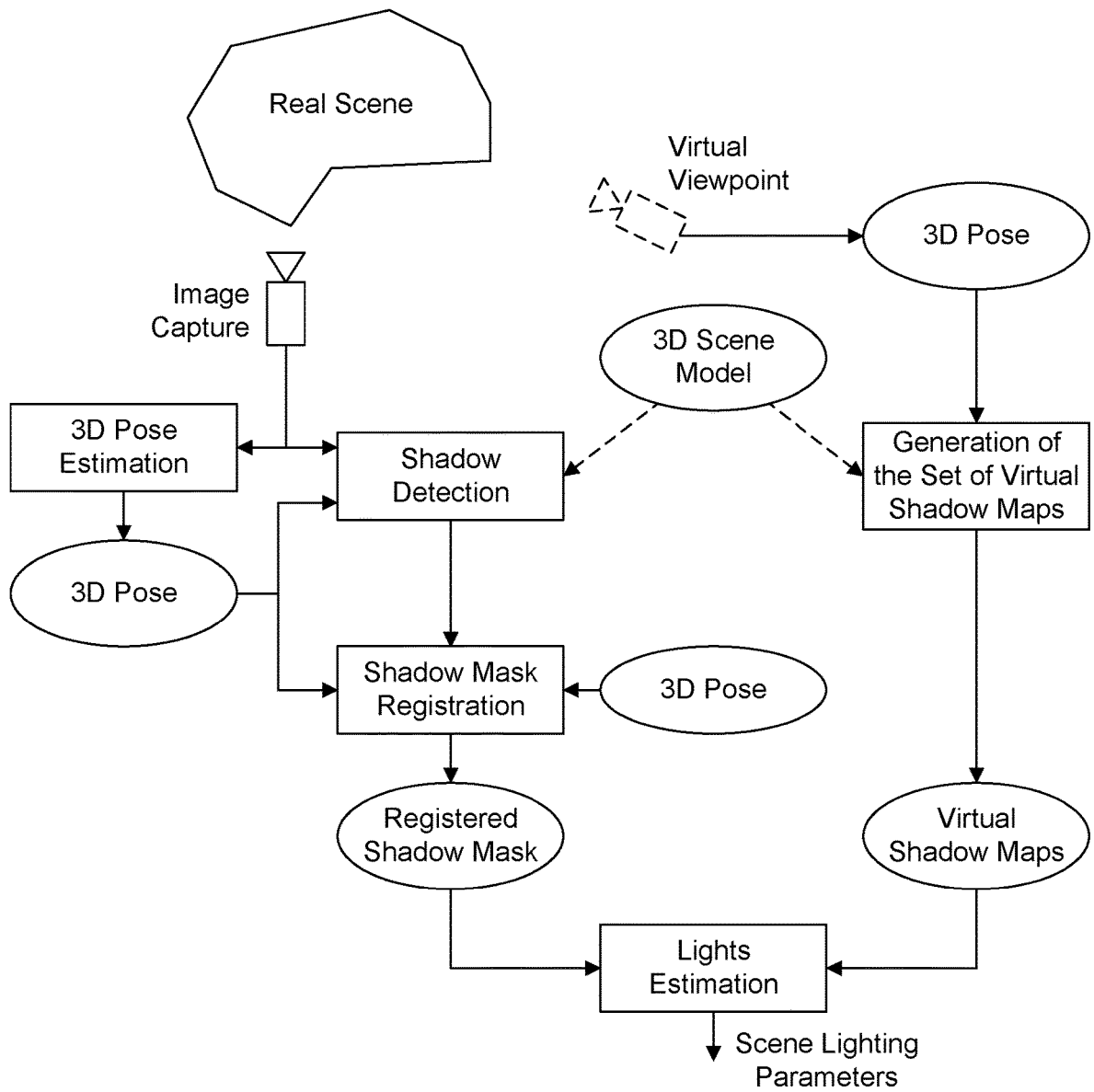
FIG. 1 is an illustration of a 3D lighting process described in based on the estimation of a set of point light sources according to one embodiment.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF PREFERRED EMBODIMENTS

FIG. 1 is an illustration of a 3D lighting process described in based on the estimation of a set of point light sources. FIG. 1 provides the modules of computation of the shadow mask on the captured input image and of registration with respect to the virtual viewpoint. Another module consists in computing the shadow maps of a set of predefined point lights distributed in three dimensional (3D) space for the virtual viewpoint. Point lights that best fit with the scene lighting model are estimated by selecting the lights which shadow maps best correlate with the shadow mask.

Figure 2A:
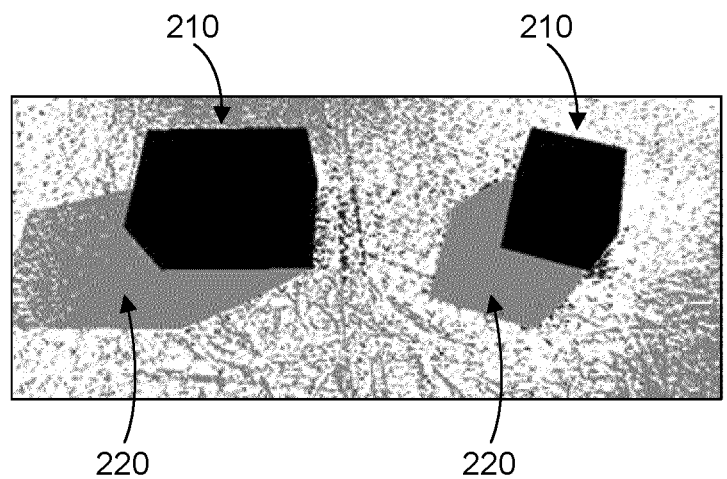
FIGS. 2A and 2B are illustration of examples of a shadow mask and a shadow map respectively.
Figure 2B:
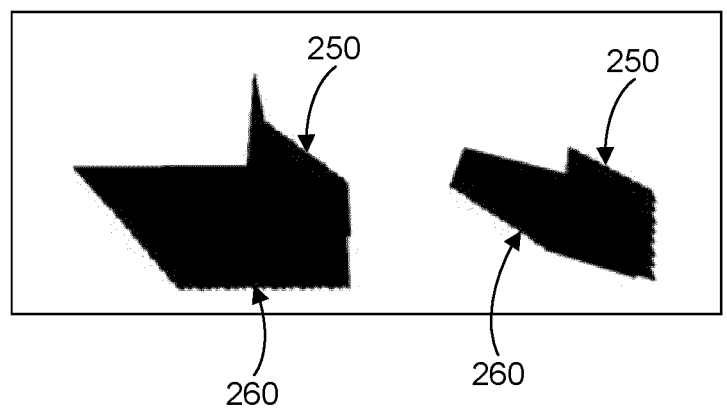

FIGS. 2A and 2B provide an example of a shadow mask and a shadow map. The shadow mask provided in FIG. 2A at 220 is obtained by detecting the shadows in the input images 210. The map provided in FIG. 2B provides an example of a shadow map selected among the set of candidate shadow maps 260 to be matched with the shadow mask 210/220.

In one situation a static camera can provide a viewpoint and images for lighting estimation. In such a case a set of candidate shadow maps is required that is attached to the static camera viewpoint and is computed at the beginning of a process that has any type of augmented, mixed or virtual reality (AR/MR/VR) application. In most AR/MR/VR experiences, the experience is often carried out on a mobile device. Consequently, the lighting information can be continuously estimated from the static camera that is sent to the mobile device. Unfortunately, the initial shadow maps computation delays the user AR/MR/VR experiences sometimes by several seconds and sometimes by much longer. Another drawback is that a camera setup is required for most such situations.

In one embodiment as will be presently discussed, the device (application device in most cases) can be used to provide the input data for lighting estimation. This will avoid using an additional static camera. Moreover, using a known 3D object as reference object will avoid any latency period due to candidate shadow maps computation, even at the beginning of the process.

Any object whose 3D geometry is available can be used as a reference object. It is especially interesting if this object is transportable and can be placed in any scene of interest for AR application. It is also particularly interesting for example if the object is common and can be found in numerous places: in this context, it is interesting to "invest" in the object by computing the data required to make it a reference object (3D geometry model if not available, candidate shadow maps, etc.). Such objects can be for example a standard microphone present in standardized conference rooms in workplaces, or a smart connected object widely available in households. Furthermore, as soon as a scene is often used for AR/MR/VR experiences that require lighting estimation, an object always present in the scene can be appointed as reference object by the user. Finally, any object large enough to be able to create significant shadows can be used as a reference object (assuming that its geometric model is available or can be obtained): the more it is used in this context, the more it is profitable to invest time to compute the pre-required data.

In one embodiment, the shadows that are analyzed for lighting estimation are the ones cast by this reference object onto the surface it lies on. An assumption is that this surface is planar so that the candidate shadow maps can be a priori computed with this model. The consequence is that the user places the reference object on a planar surface in order to be able to get reliable lighting estimates. If the surface on which the reference object is placed is not planar, its geometry is known and included in the geometric model used to compute the shadow maps. In the following, "planar surface" and "shadow surface" will refer to the surface on which are cast the shadows that is analyzed to estimate lighting.

Figure 3:
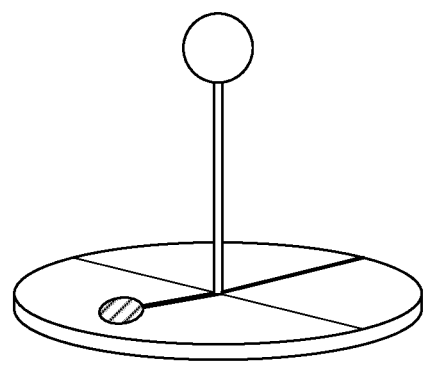
FIG. 3 is an illustration of an embodiment where an object that includes a planar basis on which shadows are cast.

FIG. 3 provides a different case in one embodiment where an object that includes a planar basis on which shadows are cast. In FIG. 3, the reference object is composed of a planar basis and an erected part which shadows are cast on the planar basis. This portable object can be placed at any place where scene lighting needs to be estimated.

Before launching AR/MR/VR application on a scene, it is asked to the user to launch 3D geometry modeling (if not available) and then lighting estimation. For that latter purpose, the user aims the device towards the scene. One or more pictures of the scene are captured and analyzed to detect reference objects adapted to lighting estimation. In the context of estimation from cast shadow maps, such object can have for example material available for lighting estimation and stored in a database, e.g. a set of candidate shadow maps attached to a virtual viewpoint. The object can be placed on a free surface adapted to cast shadows analysis (e.g. planar) or it can have its own adapted base. Some constraints such as the size of the object can limit the range of usable objects. If no such object is found, the user is informed and he can be invited to place an adapted object in the scene, at an adapted location (possibly identified by the process for its geometric properties, and shown to the user on the device display).

On the other hand, if such objects are present in the scene, one or more can be selected for lighting estimation. If material (e.g. set of candidate shadow maps cast by the object(s) on the shadow surface) is available, estimation can rely on it. Otherwise, this material is pre-computed before lighting estimation. Once computed, this material can be loaded in the database and attached to the 3D model of the corresponding object and shadow surface. In the future, it will be able to be used again directly. In a particular embodiment, if the shadow surface is not planar, its 3D model can be stored with the 3D model of the reference object, so that there can be several elements of the database that address the same reference object with a different shadow surface. In this case, retrieving the right element of the database from the captured image requires not only to retrieve the right reference object but also the right shadow surface.

Figure 4:
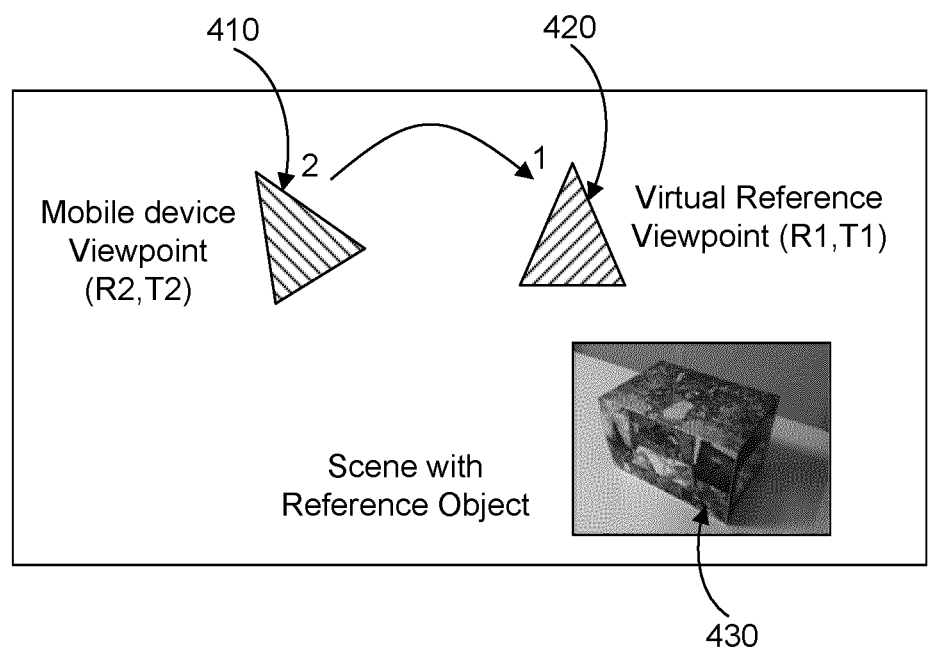
FIG. 4 is an illustration of a reference object observed by a real device camera and a virtual reference viewpoint.

It should be noted that a reference virtual view can be provided that "captures" a set of candidate shadow maps. In one embodiment, the use of a reference viewpoint can be achieved by first receiving or capturing an image of a scene, which is then processed to estimate a shadow mask as observed from a reference viewpoint. This will be then matched with the candidate shadow maps in order to identify one or more point-light(s) that correctly model that (current) lighting condition. FIG. 4 illustrates this situation by showing a reference object observed by a real device camera and a virtual reference viewpoint.

In FIG. 4's context, the user captures an image of the reference object placed in the scene, which will be processed to estimate a shadow mask observed from the reference viewpoint. An example of this is shown in the figure that provides for a reference object 430, a virtual reference viewpoint 420 and a mobile device camera viewpoint 410.

Figure 5:
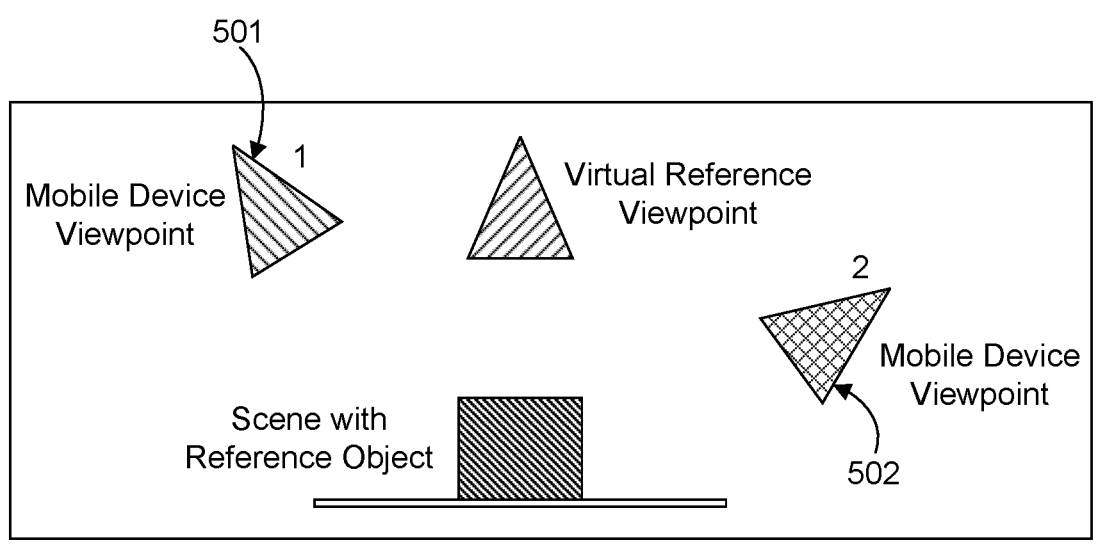
FIG. 5 is an illustration of an example of 2 mobile device viewpoints.

FIG. 5 provides an example of 2 mobile device viewpoints 501 and 502, similar to the example of FIG. 4. The two mobile device viewpoints provide 2 different images of the scene but use the unique virtual reference viewpoint for lighting estimation. The pose of the reference viewpoint can be automatically fixed to be above the reference object and placed so that it maximizes the observed area of the shadow surface.

Figure 6A:
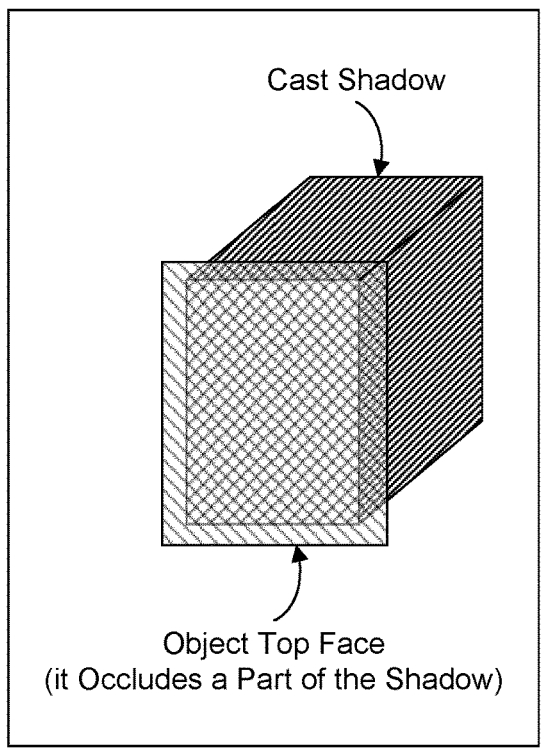
FIGS. 6A and 6B are examples of a shadow map of the virtual reference viewpoint provided with the reference object visible and not visible respectively.
Figure 6B:
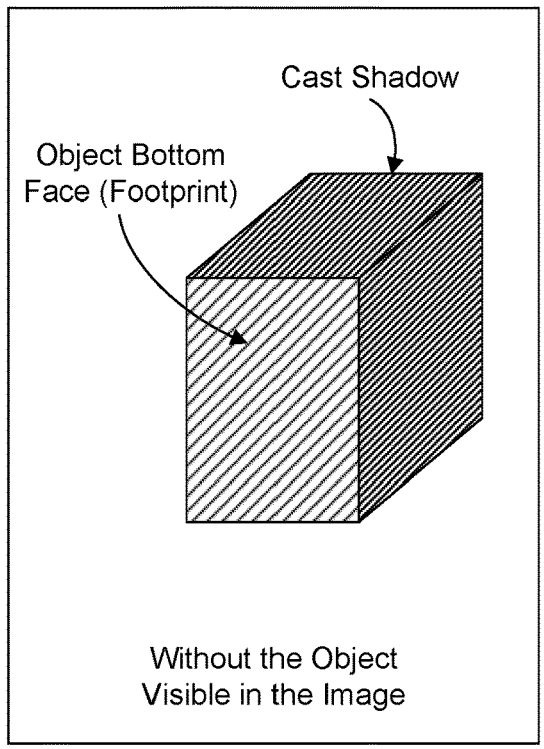

In addition, in order to maximize the area of the shadow surface that can be matched, a solution is to produce the candidate shadow maps without making the reference object appear, but only its footprint (this can be easily achieved with a rendering engine). In the same way, any obstacle between the shadow surface and the reference view can be considered for shadow production as all the elements of the scene geometry but assumed transparent with respect to visibility of the shadow surface from the reference view. In this case, the shadow surface is visible with the complete candidate shadows cast by the object on this surface. On the other hand, in presence of the object in the rendered image, the basis of the shadow maps (i.e. the part of the shadows that is close to the object) is occluded by the object itself in the 'vertical' viewpoint (i.e. with view axis perpendicular to the planar surface or to the mean plane of the shadow surface if not exactly planar). FIGS. 6A and 6B provide this illustration.

In FIG. 6A, example of a shadow map of the virtual reference viewpoint (vertical viewpoint) is provided with the reference object visible. In FIG. 6B the same is provided but without the reference object visible. This feature and the distinction are important because some shadows could be visible from a mobile device viewpoint but not visible from the reference viewpoint due to occlusion by the object, especially when a light is over the object.

In one embodiment, at the beginning of the lighting estimation process, the user places the reference object in the scene, on a shadow surface unless the reference object has its own shadow basis, in an area where the cast shadows are only due to the object. He is asked to take a picture of the scene showing the shadows, and to delineate the area on the image displayed on his device that contains these shadows. This limitation allows to exclude other objects, shadows or surfaces present in the field of view that would disrupt the lighting estimation. The user can be asked for example to place on the image, via a tactile screen, the vertices of a polygon that will delineate the area of interest.

In an alternate embodiment a default polygon can be automatically defined by the system and shown to the user on the image, so that the user can launch the estimation directly or modify the polygon before. This default polygon can be for example defined from the reference viewpoint and the 3D model of the scene: the scene model is projected onto the reference viewpoint, and a polygon is defined to include all the candidate shadow maps with the constraint that if objects of the scene are present in this area, they are excluded. Then, the resulting polygon is projected onto the captured image and shown to the user (it is the default polygon). The polygon can be described by a set of vertices with 2D coordinates in the reference viewpoint or as 3D coordinates defined in the coordinate system attached to the reference object.

Once the lighting estimation returns the result, the user can evaluate its quality. If not satisfied, he can launch again lighting estimation from the same or from another location. The last defined polygon can have been stored and can be now projected onto the current captured view. As before, the user can continue the process or modify the polygon.

As there may be different lights distributed in space, there may be several shadows cast by the reference object in various directions. It may happen that all the cast shadows cannot be visible from a unique captured viewpoint. Notice that from this standpoint, the 'vertical' viewpoint allows to cover all the directions (except the risk of occlusion for a light located over the object).

Figure 7:
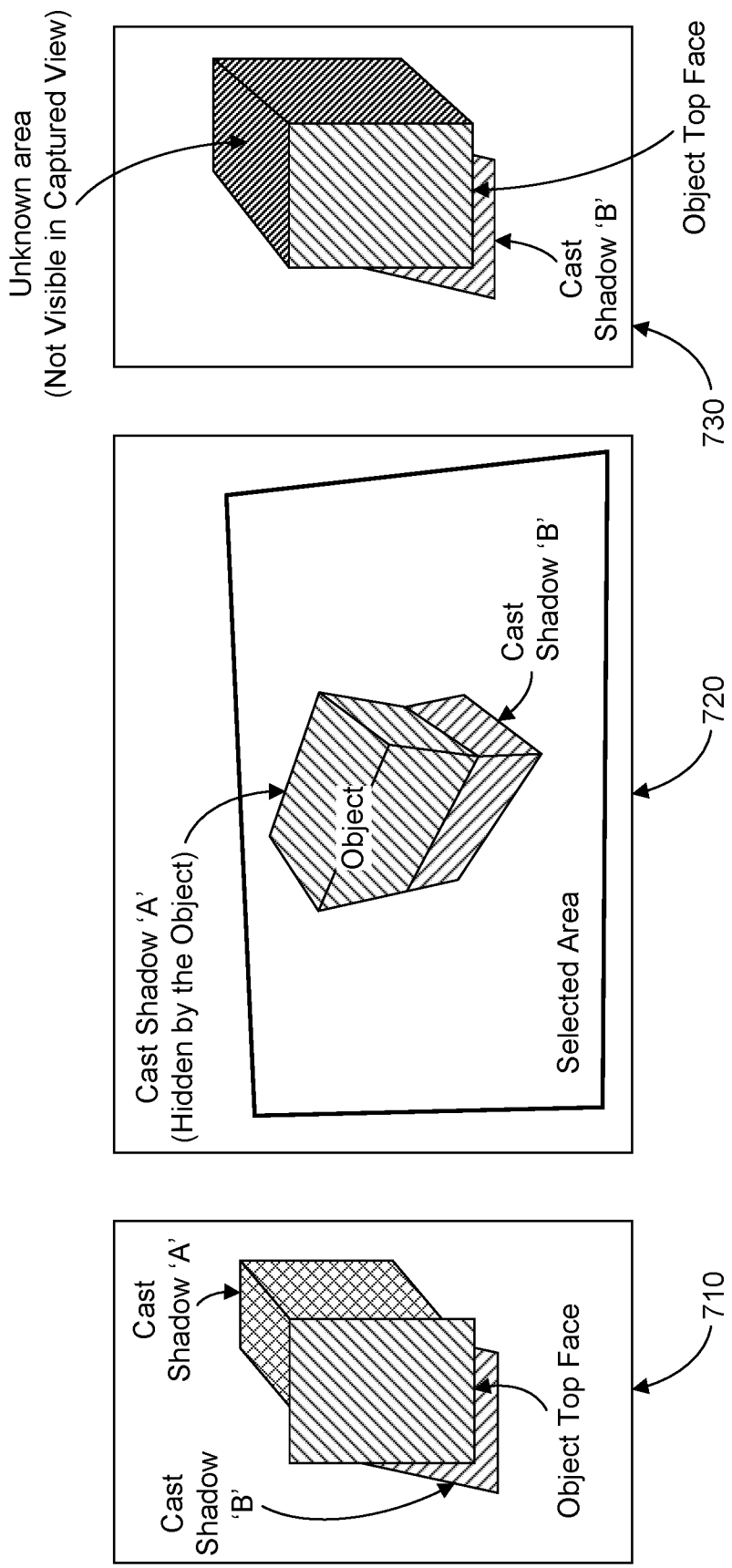
FIG. 7 is an example illustrating problems of shadow visibility due to angles of capture.

FIG. 7 provides an illustration that highlights the problem of visibility. In left FIG. delineated by reference numerals 710, a picture is provided that shows how a camera with a 'vertical' viewpoint would see the scene with 2 cast shadows due to 2 lights. In 720, (middle) the figure shows the image captured from the mobile device by the user. The problem is that one of the 2 shadows is not visible in this image. The consequence is that the shadow mask will not contain this $2^{nd}$ shadow and the estimator will only identify 1 point light corresponding to shadow 'B'. The final FIG. 730, at the right illustrates the shadow mask registered with respect to the reference viewpoint—an unknown area is visible, that corresponds to the area of the planar surface that is occluded by the reference object in the captured image. In this example, there exist other possible viewpoints from which the 2 cast shadows could be visible at least partially. But first it is not generally possible for the user to capture all the cast shadows from one viewpoint without adding his own shadow onto the scene or because such viewpoint is not accessible or simply because for some configurations it does not exist.

In one embodiment, a solution is provided to acquire several images from various viewpoints so that each piece of the area of the shadow surface selected by the user is visible at least once on a viewpoint. Each image is processed to estimate a shadow mask. All the shadow masks are then registered with respect to the reference view and put together so that a shadow mask is obtained that is more complete than if estimated from one viewpoint only. An alternative is to first project the captured images onto the reference viewpoint to form an image of the selected shadow area as complete as possible. Then, this resulting image is processed to detect the shadows and form the shadow mask that will be then matched to the candidate shadow maps.

In another embodiment, the lighting sources computation can be achieved on each of the captured images in an independent way. As a shadow of a given light can be observed (at least partially) from different viewpoints, the light can be identified more than one time with possibly different estimated parameters (3D location and color or intensity). This possible difference is due to the difference in viewpoints leading to possible incomplete observations, unfavorable viewpoint. Hence an additional step is necessary. Its goal is to consolidate the lighting sources by identifying the ones detected several times and deriving a unique estimate via classical robust methods. Determining that the same shadow is present on several captures can be done thanks to the camera pose when the image was captured. The selection of the most consistent set of parameters can be obtained for example by selecting the ones providing the highest correlation values provided by the matching process, as it is done for a unique view.

Some constraints can be applied to the captured image/viewpoint in order to be in the best conditions for an accurate lighting estimation. For example, the reference object is preferably close to the center of the image (evaluated via the distance in pixels of the object center to the image center) and located at a distance from the device under a given distance. Another criterion concerns the selected area: the reference selected area (defined by polygon vertices which location expressed in the coordinate system attached to the reference object) is projected onto the current captured image, and is totally contained in the current viewpoint. The pose of the current viewpoint with respect to the reference viewpoint is also a criterion for example via the dot product between the viewpoint axis and the vertical axis compared to a threshold (validated if the dot product is above a threshold). If all these conditions are validated, then the captured image is validated, and the lighting estimation can continue. Otherwise, it can be stopped. In addition, a light can indicate to the user if the conditions are satisfied for lighting estimation: for example "green" indicates that estimation is possible, "orange" that the conditions are almost satisfied (estimation can be possibly forced, or a new acquisition with few adequate changes is to be done), "red" that they are not satisfied (far from being satisfied) and a new acquisition with different conditions is necessary in some embodiments.

In a specific user interface (UI), the user can be assisted in positioning the device camera in order to complete the visibility of the selected area. The 'vertical' view can show the surfaces of the selected area that have been observed from captured views and the ones not yet observed. It can also show the surfaces currently observed by the device camera in the 'vertical' view so that the user can adjust the view before capturing an image.

The reference viewpoint can be for example located at a distance with respect to the reference object that allows the viewpoint to contain the surface area selected by the user or to contain the shadows of all the candidate shadow maps. The lighting estimation system based on a reference object and a reference view is a flexible solution that can be easily used in numerous scenes. In particular, as the shadow maps are precomputed there is no delay. Once the lighting has been estimated, it can be used for an AR application. In this context, lighting is assumed to be static. When lighting has changed, the user launches again lighting estimation. The result of lighting estimation can be shown to the user in the form of the contours of the shadows in the shadow maps selected by the estimation.

Figure 8:
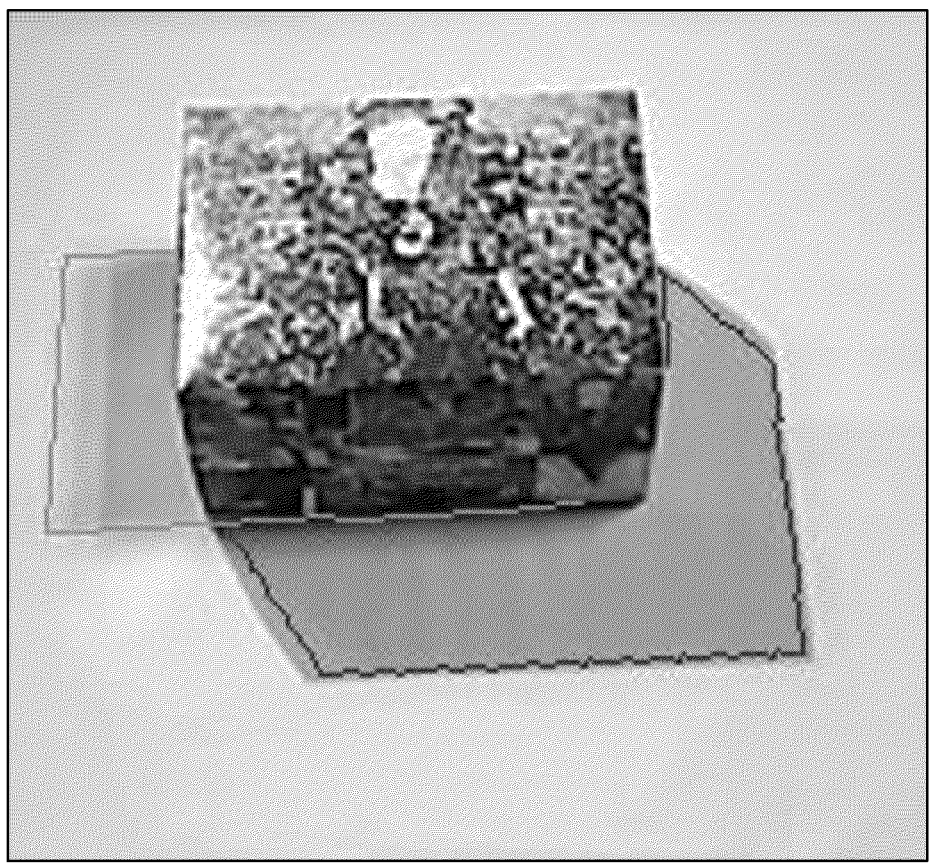
FIG. 8 is an illustration of an example of contours when shadows are superimposed.

FIG. 8 is an illustration of an example of contours of such shadows that are superimposed to the captured image. This is obtained by projecting (registration) the selected shadow maps of the reference view onto the captured view and making the contours of the shadows appear on the captured image. Another way to create these shadow contours is to compute the shadow maps of the selected point lights for the captured viewpoint. From this display, if not satisfied, the user can run a new lighting estimation with a new captured image. As shown, in the example of FIG. 8, contours of two shadow maps are selected during lighting estimation. These contours are superimposed to the captured image.

An alternate to the display of contours is to apply virtual lighting to the current scene and image so that the estimated point lights virtually illuminate the scene and create shadows that are superimposed to the real ones. This way the user can also evaluate the quality of lighting estimation.

In another alternate embodiment, a virtual object can be placed on the scene surface and to apply virtual lighting to the scene so that the user can compare the virtual shadows cast by the virtual object with the real ones cast by the reference object. The virtual object can be placed automatically near the reference object outside the detected shadows so that there is no interference between real and virtual shadows.

During the application, the user can also ask the evaluation display on a new captured image in order to check if the light estimates are still valid. In one embodiment, one can visually compare these contours with the real shadows in the image. Then, if he deems it useful, he can run a new lighting estimation.

In an alternate embodiment, the situation of dynamic lighting can be addressed. In such a situation, the lighting estimation can run continuously by remaining a background task using images captured by the device camera for user application. The process is roughly the same as in the case of a unique capture with differences that are discussed hereafter. In this context, as image is captured without user knowledge, some precautions are taken. For example, images captured during fast motions of the device should avoided, so a step involves identifying if the device motion conditions are correct to validate or not image acquisition. It can be carried out for example from the inertial measurement unit (IMU) embedded in the device, or from the analysis of the captured image via its local gradients. If respectively motion is above a threshold or the sum of square values of local gradients is under a threshold, then respectively there is no image capture, or the captured image is abandoned. Then, once an image has been captured (and validated), as in the single image case, the reference object is detected (if not present, the estimation is stopped). Then, the selected area (defined by polygon vertices which location can be expressed in the coordinate system attached to the reference object) is projected onto the current captured image, if it is not totally contained in the current viewpoint, the capture can be rejected. The pose of the current viewpoint with respect to the reference object can also be a criterion to reject this capture. For example, if the captured view is too far from a bird's eye view (for example, the dot product between the viewpoint axis and the vertical axis can provide a satisfaction value that rejects the capture if the value is below a threshold), it can be ignored. If these previous conditions all validate the captured image, then the other steps of lighting estimation are carried out and the module returns a result consisting of a set of point lights (between zero and the maximal number estimated by the module) with their characteristics, plus an ambient light with intensity/color value.

In order to avoid any nuisance noise effects that make lighting estimates continuously fluctuate, some temporal filtering can be opportunely introduced. In particular, in most cases, lighting is globally static with abrupt changes between static periods. In this context, different ways to filter lighting estimates can be considered:

Stability/Change detection: for example, the small fluctuations in 3D location and intensity can be ignored: computation of distance between point lights locations and difference between point lights intensities at two successive estimations; then comparison to a threshold: if the distance is below a threshold and if the absolute difference is below a threshold, then the new estimate is ignored (stability is validated).

Change validation: for example, if a change has been detected (for example via the previous method), it can be validated only if stability is checked in a given number of next successive estimates. If so, the new point lights replace the previous ones.

In an alternate embodiment, a background task can run during the application which purpose is limited to an automatic evaluation of quality of the lighting estimates and to an alert to the user if there is a need to re-estimate lighting. The first steps of this task are like the previous scheme of continuous lighting estimation up to the computation of the shadow mask, then this shadow mask is correlated with simultaneously all the shadow maps of the currently estimated point lights. The resulting correlation value is compared to a threshold, and if it is under a threshold, a "red" light can alert the user that there is a change in the lighting. On the other hand, an "orange" light can indicate that it is not possible to evaluate the quality of lighting estimates (e.g. the conditions previously mentioned that are satisfied before estimating lights or evaluating relevance of current estimates are not fulfilled or satisfied), a possible "green" light can indicate that lighting estimates are still valid.

In a case where more than one user/player in the application, the continuous lighting estimation as a background task can exploit the various users devices viewpoints by capturing images from these devices and processing them according to the description corresponding to the use of more than one image for lighting estimation.

Figure 9:
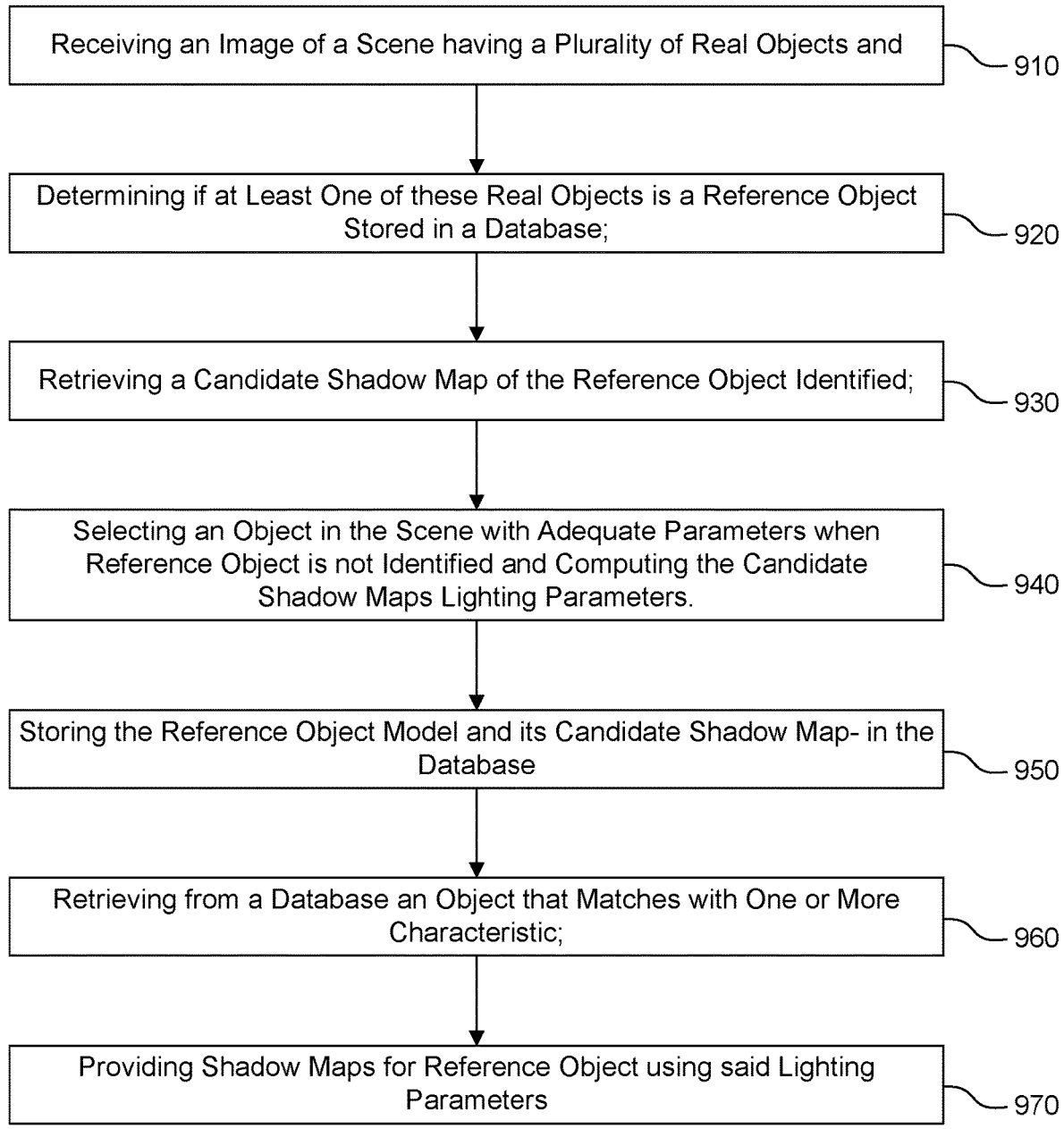
FIG. 9 is a flow chart illustration of one embodiment.

FIG. 9 is a flowchart illustration of one embodiment for processing images. In step 910, an image is received of a scene having a plurality of real objects and in step 920 it is determined if at least one of these real objects is a reference object stored in a database. In step 930, a candidate shadow map of the reference object identified is retrieved when available. In step 940, when a reference object cannot be identified, an object in the scene with adequate parameters is selected and the candidate shadow maps of this new reference object using said lighting parameters is computed. In step 950, the reference object is stored in a database—this could be even a reference object model—as well as its candidate shadow map—in the database. In step 960, an object is retrieved from the database such that the object matches with one or more characteristic of a real object in said scene. In step 970, the shadow maps for reference object appearing in the scene is provided, using said lighting parameters.

Basically, in one embodiment the reference object is first identified in the scene and the computation of the virtual candidate shadow maps is performed, each one displaying the shadow cast by the reference object due to a candidate point-light (better if these maps have been precomputed and they are available in the database with the corresponding object model). Subsequently, lighting estimation is performed by
  a. Detection of the real shadows cast by the reference object in the captured image→shadow mask
  b. Matching the shadow mask with the candidate shadow maps to identify the point-lights that best fit the observed lighting Steps 2 and 3.*b* can be carried out either on the captured viewpoint or on a reference viewpoint (this latter point is an important element of the invention).

In one embodiment, reference object and reference viewpoint are both used to estimate lighting: the reference object is real (selected object) and the reference viewpoint is virtual (it is introduced to avoid multiple computations of the candidate shadow maps attached to a reference object). In one embodiment, an element of the database is the 3D model of a reference object (geometry, texture) and the set of candidate shadow maps cast by this reference object due to a set of candidate point-lights.

In this context, in one embodiment, before launching AR/MR/VR application on a scene, it is asked to the user to launch 3D geometry modeling (if not available) and then lighting estimation. For that latter purpose, the user aims the device towards the scene. One or more pictures of the scene are captured and analyzed to detect reference objects adapted to lighting estimation. In the context of estimation from cast shadow maps, such object can have for example material available for lighting estimation and stored in a database, e.g. a set of candidate shadow maps. The object can be placed on a free surface adapted to cast shadows analysis (e.g. planar) or it can have its own adapted base. Some constraints such as the size of the object can limit the range of usable objects. If no such object is found, the user is informed and he can be invited to place an adapted object in the scene, at an adapted location (possibly identified by the process for its geometric properties, and shown to the user on the device display).

In another embodiment, if such objects are present in the scene, one or more can be selected for lighting estimation. If material (e.g. set of candidate shadow maps cast by the object(s) on the shadow surface) is available, estimation can rely on it. Otherwise, this material is pre-computed before lighting estimation. Once computed, this material can be loaded in the database and attached to the 3D model of the corresponding object and shadow surface. In the future, it will be able to be used again directly.

Figure 10:
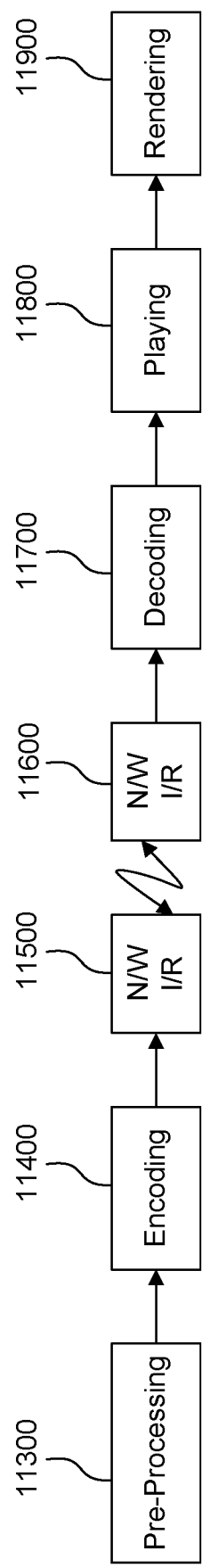
FIG. 10 schematically illustrates a general overview of an encoding and decoding system according to one or more embodiments.

FIG. 10 schematically illustrates a general overview of an encoding and decoding system according to one or more embodiments. The system of FIG. 10 is configured to perform one or more functions and can have a pre-processing module 1100 to prepare a received content (including one more images or videos) for encoding by an encoding device 11400. The pre-processing module 11300 may perform multi-image acquisition, merging of the acquired multiple images in a common space and the like, acquiring of an omnidirectional video in a particular format and other functions to allow preparation of a format more suitable for encoding. Another implementation might combine the multiple images into a common space having a point cloud representation. Encoding device 11400 packages the content in a form suitable for transmission and/or storage for recovery by a compatible decoding device 11700. In general, though not strictly required, the encoding device 11400 provides a degree of compression, allowing the common space to be represented more efficiently (i.e., using less memory for storage and/or less bandwidth required for transmission). In the case of a 3D sphere mapped onto a 2D frame, the 2D frame is effectively an image that can be encoded by any of a number of image (or video) codecs. In the case of a common space having a point cloud representation, the encoding device 6400 may provide point cloud compression, which is well known, e.g., by octree decomposition. After being encoded, the data, is sent to a network interface 11500, which may be typically implemented in any network interface, for instance present in a gateway. The data can be then transmitted through a communication network 11500, such as internet but any other network may be foreseen. Then the data received via network interface 11600 may be implemented in a gateway, in a device. After reception, the data are sent to a decoding device 11700. Decoded data are then processed by the device 11800 that can be also in communication with sensors or users input data. The decoder 11700 and the device 11800 may be integrated in a single device (e.g., a smartphone, a game console, a STB, a tablet, a computer, etc.). In another embodiment, a rendering device 11900 may also be incorporated.

In one embodiment, the decoding device 11700 can be used to obtain an image that includes at least one color component, the at least one color component including interpolated data and non-interpolated data and obtaining metadata indicating one or more locations in the at least one color component that have the non-interpolated data.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method implemented by a device, the method comprising:
  determining a real object in an augmented reality scene observed through the device, for which a set of candidate shadow maps and associated lighting models are stored in a memory associated with the device;
  selecting, from the set of candidate shadow maps, a candidate shadow map that matches with a shadow map determined from a shadow mask of the real object in the augmented reality scene as observed through the device; and adding virtual shadows to virtual objects in the augmented reality scene according to a lighting model associated with the selected candidate shadow map; and wherein the shadow mask of the real object in the augmented reality scene is based on shadows cast by the real object on a non-planar surface on which the real object is placed, a geometry of the non-planar surface being included in a geometric model used to obtain the set of candidate shadow maps.

2. The method of claim 1, wherein the determined real object is placed in an area of the augmented reality scene such that shadows cast in the area are only due to the real object.

3. The method of claim 2, further comprising:
delineating an area of the augmented reality scene containing the shadows cast by the real object.

4. The method of claim 3, wherein the delineating is performed by placement of vertices of a polygon.

5. A device comprising at least one processor, the at least one processor configured to:
determine a real object in an augmented reality scene observed through the device, for which a set of candidate shadow maps and associated lighting models are stored in a memory associated with the device;
select, from the set of candidate shadow maps, a candidate shadow map that matches with a shadow map determined from a shadow mask of the real object in the augmented reality scene as observed through the device; and
add virtual shadows to virtual objects in the augmented reality scene according to a lighting model associated with the selected candidate shadow map;
wherein the shadow mask of the real object in the augmented reality scene is based on shadows cast by the real object on a non-planar surface on which the real object is placed, a geometry of the non-planar surface being included in a geometric model used to obtain the set of candidate shadow maps.

6. The device of claim 5, wherein the determined real object is placed in an area of the augmented reality scene such that shadows cast in the area are only due to the real object.

7. The device of claim 6, wherein the at least one processor is further configured to delineate an area of the augmented reality scene containing the shadows cast by the real object.

8. The device of claim 7, wherein the at least one processor is further configured to perform the delineating by placement of vertices of a polygon.

9. A non-transitory computer readable medium storing instructions which, when executed by one or more processors, cause the one or more processors to perform a method comprising:
determining a real object in an augmented reality scene observed through the device, for which a set of candidate shadow maps and associated lighting models are stored in a memory associated with the device;
selecting, from the set of candidate shadow maps, a candidate shadow map that matches with a shadow map determined from a shadow mask of the real object in the augmented reality scene as observed through the device; and
adding virtual shadows to virtual objects in the augmented reality scene according to a lighting model associated with the selected candidate shadow map;
wherein the shadow mask of the real object in the augmented reality scene is based on shadows cast by the real object on a non-planar surface on which the real object is placed, geometry of the non-planar surface being included in a geometric model used to obtain the set of candidate shadow maps.

10. The non-transitory computer readable medium of claim 9, wherein the determined real object is placed in an area of the augmented reality scene such that shadows cast in the area are only due to the real object.

11. The non-transitory computer readable medium of claim 10, wherein the instructions further cause the one or more processors to delineate an area of the augmented reality scene containing the shadows cast by the real object.

12. The non-transitory computer readable medium of claim 11, wherein the instructions further cause the one or more processors to delineate the area by placement of vertices of a polygon.

* * * * *